(12) United States Patent
Hafner et al.

(10) Patent No.: US 11,827,217 B2
(45) Date of Patent: Nov. 28, 2023

(54) VEHICLE DETECTION AND RESPONSE

(71) Applicant: Ford Global Technologies, LLC, Dearborn, MI (US)

(72) Inventors: Michael Hafner, Palo Alto, CA (US); Mrdjan J. Jankovic, Birmingham, MI (US); Yousaf Rahman, Ypsilanti, MI (US); Abhishek Sharma, Ann Arbor, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 17/005,389

(22) Filed: Aug. 28, 2020

(65) Prior Publication Data

US 2022/0063610 A1 Mar. 3, 2022

(51) Int. Cl.
*B60W 30/095* (2012.01)
*B60W 30/09* (2012.01)
*B60W 40/105* (2012.01)

(52) U.S. Cl.
CPC ........ *B60W 30/0956* (2013.01); *B60W 30/09* (2013.01); *B60W 40/105* (2013.01); *B60W 2552/30* (2020.02); *B60W 2552/53* (2020.02); *B60W 2554/404* (2020.02)

(58) Field of Classification Search
None
See application file for complete search history.

(56) References Cited

U.S. PATENT DOCUMENTS

| | | | | |
|---|---|---|---|---|
| 11,465,620 | B1* | 10/2022 | Lukarski | B60W 30/12 |
| 2016/0104381 | A1* | 4/2016 | Nath | G08G 1/167 |
| | | | | 701/23 |
| 2016/0375901 | A1* | 12/2016 | Di Cairano | G01C 21/34 |
| | | | | 701/26 |
| 2017/0253241 | A1* | 9/2017 | Filev | B60W 10/18 |
| 2017/0316684 | A1* | 11/2017 | Jammoussi | G08G 1/096716 |
| 2018/0208186 | A1* | 7/2018 | Liu | B60W 10/04 |

(Continued)

OTHER PUBLICATIONS

Ames, Aaron D., et al., "Control Barrier Functions: Theory and Applications," arXiv:1903.11199 [cs.SY], Mar. 27, 2019, 12 pages.

*Primary Examiner* — Isaac G Smith
*Assistant Examiner* — Jennifer M Anda
(74) *Attorney, Agent, or Firm* — Frank A. MacKenzie; Bejin Bieneman PLC (57) ABSTRACT

A computer is programmed to identify first and second virtual boundaries of a roadway lane based on a predicted boundary between the roadway lane and an adjacent roadway lane, determine a first constraint value based on a first virtual boundary approach acceleration, determine a second constraint value based on a second virtual boundary approach acceleration, output a prescribed steering angle, brake input, and propulsion input when one of the constraint values violates a respective threshold, and actuate components to attain the prescribed steering angle, brake input, and propulsion input. The first virtual boundary approach acceleration is based on a steering wheel angle of a vehicle and input to one of a brake or a propulsion of the vehicle. The second virtual boundary approach acceleration is based on a steering wheel angle of the vehicle and input to one of a brake or a propulsion of the vehicle.

20 Claims, 5 Drawing Sheets

(56) References Cited

U.S. PATENT DOCUMENTS

| | | | |
|---|---|---|---|
| 2018/0281856 A1* | 10/2018 | Talamonti | B60W 50/14 |
| 2018/0286242 A1* | 10/2018 | Talamonti | B60W 30/09 |
| 2019/0047553 A1* | 2/2019 | Yokoyama | B60W 10/20 |
| 2020/0207372 A1* | 7/2020 | Akamatsu | G01C 21/3492 |
| 2020/0216090 A1* | 7/2020 | Zaseck | B60W 30/0953 |
| 2020/0218906 A1* | 7/2020 | Wang | G06V 20/588 |
| 2021/0262808 A1* | 8/2021 | Wang | B60W 30/0953 |
| 2021/0276546 A1* | 9/2021 | Rahman | B60W 30/09 |
| 2021/0404835 A1* | 12/2021 | Kim | G01C 21/32 |
| 2022/0073063 A1* | 3/2022 | Jankovic | B60W 10/04 |

* cited by examiner

VEHICLE DETECTION AND RESPONSE

BACKGROUND

A vehicle can use sensors to detect objects. For example, an object on a roadway can be referred to as a target, or target object. Vehicle sensors can detect a target position and speed relative to the vehicle. For example, the sensors can detect the position of the target relative to the vehicle. The vehicle can respond to detecting the target, e.g., by steering away from the target, by braking prior to reaching the target, etc.

DETAILED DESCRIPTION

A system includes a computer including a processor and a memory, the memory storing instructions executable by the processor to identify first and second virtual boundaries of a roadway lane based on a predicted boundary line between the roadway lane and an adjacent roadway lane, determine a first constraint value based on a first virtual boundary approach acceleration, the first virtual boundary approach acceleration based on a steering wheel angle of a vehicle and input to one of a brake or a propulsion of the vehicle, determine a second constraint value based on a second virtual boundary approach acceleration, the second virtual boundary approach acceleration based on a steering wheel angle of the vehicle and input to one of a brake or a propulsion of the vehicle, output, from a minimized cost function, a prescribed steering angle, a prescribed brake input, and a prescribed propulsion input when one of the first or second constraint values violates a respective threshold, and actuate one or more components to attain the prescribed steering angle, the prescribed brake input, and the prescribed propulsion input.

The instructions can further include instructions to determine a third constraint value based on predicted probability of a collision between the vehicle and a target vehicle and to output the prescribed steering angle, the prescribed brake input, and the prescribed propulsion input when the third constraint value violates a threshold.

The output from the minimized cost function can violate one of the thresholds for the first constraint value or the second constraint value and not violate the threshold for the third constraint value.

The instructions can further include instructions to predict the probability of the collision based on a lateral distance between the vehicle and the target vehicle and a longitudinal distance between the vehicle and the target vehicle.

The instructions can further include instructions to predict the probability of the collision based on a lateral acceleration between the vehicle and the target vehicle and a longitudinal acceleration between the vehicle and the target vehicle.

The instructions can further include instructions to determine a third constraint value based on a predicted curvature of the roadway lane and to output the prescribed steering angle, the prescribed brake input, and the prescribed propulsion input when the third constraint value violates a threshold.

The instructions can further include instructions to determine a third virtual boundary of the roadway lane and to determine the third constraint value based on a third virtual boundary approach acceleration.

The instructions can further include instructions to determine a third constraint value based on a maximum steering angle and to output the prescribed steering angle, the prescribed brake input, and the prescribed propulsion input when the third constraint value violates a threshold.

The instructions can further include instructions to determine a third constraint value based on a maximum throttle input and a maximum brake input and to output the prescribed steering angle, the prescribed brake input, and the prescribed propulsion input when the third constraint value violates a threshold.

The instructions can further include instructions to minimize the cost function with a quadratic programming algorithm.

The first virtual boundary can be a lateral distance of the vehicle to a left boundary line of the roadway lane and the second virtual boundary can be a lateral distance of the vehicle to a right boundary line of the roadway lane.

The instructions can further include instructions to determine the first constraint value based on a first virtual boundary approach velocity.

A method, includes identifying first and second virtual boundaries of a roadway lane based on a predicted boundary line between the roadway lane and an adjacent roadway lane, determining a first constraint value based on a first virtual boundary approach acceleration, the first virtual boundary approach acceleration based on a steering wheel angle of a vehicle and input to one of a brake or a propulsion of the vehicle, determining a second constraint value based on a second virtual boundary approach acceleration, the second virtual boundary approach acceleration based on a steering wheel angle of the vehicle and input to one of a brake or a propulsion of the vehicle, outputting, from a minimized cost function, a prescribed steering angle, a prescribed brake input, and a prescribed propulsion input when one of the first or second constraint values violates a respective threshold, and actuating one or more components to attain the prescribed steering angle, the prescribed brake input, and the prescribed propulsion input.

The method can further include determining a third constraint value based on predicted probability of a collision between the vehicle and a target vehicle and outputting the prescribed steering angle, the prescribed brake input, and the prescribed propulsion input when the third constraint value violates a threshold.

The method can further include predicting the probability of the collision based on a lateral distance between the vehicle and the target vehicle and a longitudinal distance between the vehicle and the target vehicle.

The method can further include predicting the probability of the collision based on a lateral acceleration between the vehicle and the target vehicle and a longitudinal acceleration between the vehicle and the target vehicle.

The method can further include determining a third constraint value based on a predicted curvature of the roadway lane and outputting the prescribed steering angle, the prescribed brake input, and the prescribed propulsion input when the third constraint value violates a threshold.

The method can further include determining a third virtual boundary of the roadway lane and to determine the third constraint value based on a third virtual boundary approach acceleration.

The method can further include determining a third constraint value based on a maximum steering angle and outputting the prescribed steering angle, the prescribed brake input, and the prescribed propulsion input when the third constraint value violates a threshold.

The method can further include determining a third constraint value based on a maximum throttle input and a maximum brake input and outputting the prescribed steering angle, the prescribed brake input, and the prescribed propulsion input when the third constraint value violates a threshold.

The method can further include minimizing the cost function with a quadratic programming algorithm.

The method can further include determining the first constraint value based on a first virtual boundary approach velocity.

A system includes a brake, a propulsion, means for identifying first and second virtual boundaries of a roadway lane based on a predicted boundary line between the roadway lane and an adjacent roadway lane, means for determining a first constraint value based on a first virtual boundary approach acceleration, the first virtual boundary approach acceleration based on a steering wheel angle of a vehicle and input to one of the brake or the propulsion, means for determining a second constraint value based on a second virtual boundary approach acceleration, the second virtual boundary approach acceleration based on a steering wheel angle of the vehicle and input to one of the brake or the propulsion, means for outputting, from a minimized cost function, a prescribed steering angle, a prescribed brake input, and a prescribed propulsion input when one of the first or second constraint values violates a respective threshold, and means for actuating one or more vehicle components to attain the prescribed steering angle, the prescribed brake input, and the prescribed propulsion input.

The system can further include means for determining a third constraint value based on predicted probability of a collision between the vehicle and a target vehicle and means for outputting the prescribed steering angle, the prescribed brake input, and the prescribed propulsion input when the third constraint value violates a threshold.

The system can further include means for determining a third constraint value based on a predicted curvature of the roadway lane and means for outputting the prescribed steering angle, the prescribed brake input, and the prescribed propulsion input when the third constraint value violates a threshold.

The system can further include means for determining the first constraint value based on a first virtual boundary approach velocity.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Planning operation of a host vehicle, particularly planning steering, acceleration, and braking operation, allows the host vehicle to remain within a roadway lane on a roadway. A computer in the host vehicle actuates one or more components according to the planned steering, acceleration, and/or braking. Changes in the roadway lane, such as the roadway lane curving, can result in changes to the planned steering, acceleration, and/or braking that the computer implements. Movement of a target vehicle can also result in changes to the planned operation of the host vehicle. The computer can identify virtual boundaries with boundary equations with respect to which the changes to the planned operation from changes in the roadway land and/or movement of the target vehicle can be quantified and evaluated. Further, the computer can plan operation of the host vehicle to remain within the virtual boundaries.

The host vehicle can identify one or more constraint values representing motion of the host vehicle and the target vehicle. The constraint values are based on velocity and acceleration at which the host vehicle and the target vehicle approach the virtual boundaries. When one or more of the constraint values violate respective thresholds, the host vehicle can determine a minimum change in the steering angle and a minimum change in the acceleration and/or braking such that the constraint values do not violate the thresholds. The host vehicle can, based on the changes in the steering angle and the acceleration and/or braking, actuate one or more components. The virtual boundaries, boundary approach velocity, and boundary approach acceleration allow the host vehicle to predict movement of the host vehicle and the target vehicle with less data and fewer computations than other approaches, e.g., a machine learning program. Using the boundary approach velocity and the boundary approach acceleration can allow the host vehicle to remain in the roadway lane and/or avoid a collision with the target vehicle crossing one of the virtual boundaries and to adjust operation of one or more components prior to the host vehicle reaching the virtual boundaries.

Figure 1:
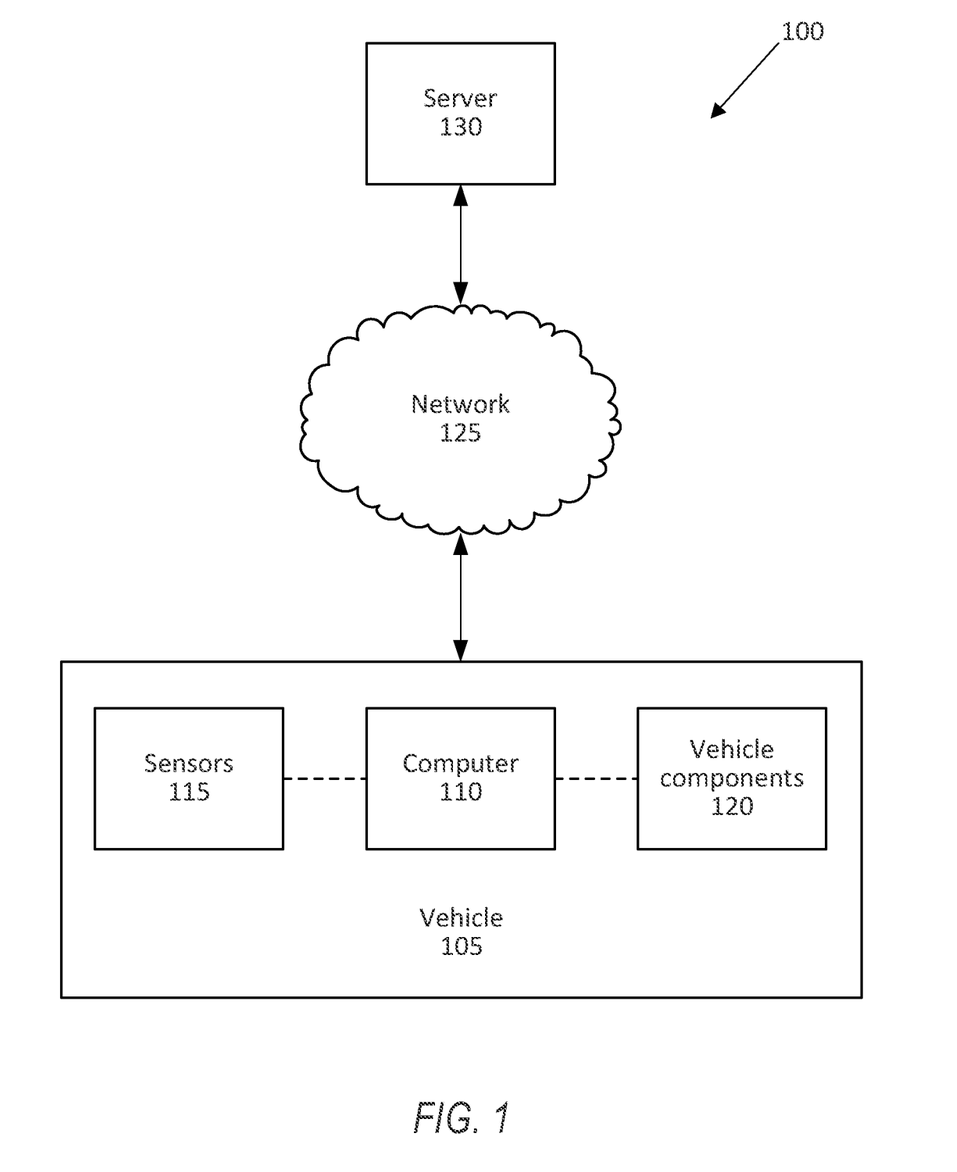
FIG. 1 is a diagram of an example system for operating a vehicle.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle network.

A vehicle 105 can operate in one of a fully autonomous mode, a semiautonomous mode, or a non-autonomous mode. A fully autonomous mode is defined as one in which each of vehicle propulsion (typically via a powertrain including an electric motor and/or internal combustion engine), braking, and steering are controlled by the computer 110. A semiautonomous mode is one in which at least one of vehicle propulsion (typically via a powertrain including an electric motor and/or internal combustion engine), braking, and steering are controlled at least partly by the computer 110 as opposed to a human operator. In a non-autonomous mode, i.e., a manual mode, the vehicle propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
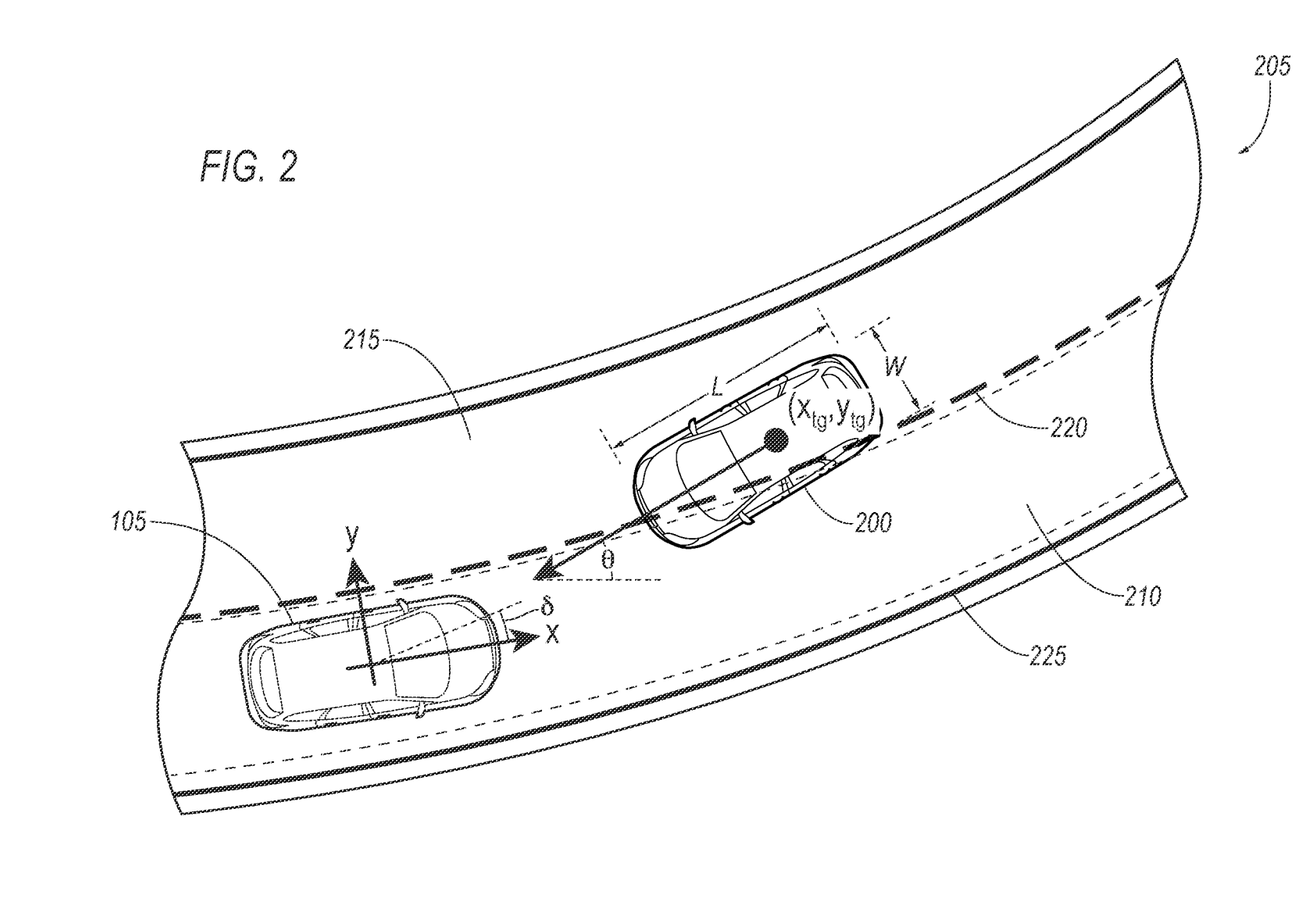
FIG. 2 is a top-down view of a roadway with the vehicle and a target vehicle.

FIG. 2 is a diagram of a host vehicle 105 and a target vehicle 200 on a roadway 205. The "target" vehicle 200 is a vehicle detected by the host vehicle 105. The roadway 205 includes a first roadway lane 210 and a second roadway lane 215. The first roadway lane 210 on which the host vehicle travels is a "host" roadway lane 210, and the second roadway lane 215 on which the target vehicle travels is a "target" roadway lane 215. The first roadway lane 210 has a left boundary line 220 and a right boundary line 225.

The computer 110 can generate a first virtual boundary and a second virtual boundary. In this context, a "virtual boundary" is a set of geo-coordinates representing a virtual line on a roadway 205. That is, the virtual boundary is a virtual line on a map stored in the computer 110. For example, the first virtual boundary can represent a dividing line between the host roadway lane 210 and the target roadway lane 215, and the second virtual boundary can represent a dividing line between the host roadway lane 210 and a shoulder of the roadway 205.

The computer 110 can collect data about the target vehicle 200 to generate the virtual boundaries. The data can include a position of the target vehicle 200. A "position" of the target vehicle 200 is a set of coordinates $\hat{x}$, $\hat{y}$ defining a point in a global coordinate system, where is a geo-coordinate defining a latitude and $\hat{y}$ is a geo-coordinate defining a longitude. The $\hat{x}$ position of the target vehicle 200 is the geo-coordinates of a specified part of the target vehicle 200, e.g., a center of a front bumper, a center of a rear axle, etc., and can be specified as $\hat{x}_t$, $\hat{y}_t$.

The host vehicle 105 defines a vehicle coordinate system. The vehicle coordinate system defines points x, y, where x is a coordinate along a longitudinal axis of the host vehicle 105 and y is a coordinate along a lateral axis of the host vehicle 105. That is, x coordinates extend in a vehicleforward and vehicle-rearward direction, and y coordinates extend in a vehicle-crosswise direction. The position of the target vehicle 200 in the vehicle coordinate system is $x_{tg}$, $y_{tg}$. That is, $x_{tg}$ is a "longitudinal position" that defines a "longitudinal distance" between the host vehicle 105 and the target vehicle 200, and $y_{tg}$ is a "lateral position" that defines a "lateral distance" between the host vehicle 105 and the target vehicle 200. The computer 110 can determine the position of the target vehicle 200 at a specific time t, i.e., the values $x_{tg}$, $y_{tg}$ are functions of time t: $x_{tg}(t)$, $y_{tg}(t)$. Reference to the dependence on t may be omitted below for ease of description, and $x_{tg}$, $y_{tg}$ are understood to be the position of the target vehicle 200 at the time t. The position of the target vehicle 200 as a function of time t over a time period $\bar{t}$ is a "predicted path" of the target vehicle 200.

The computer 110 can identify a plurality of data about the host vehicle 105 and the target vehicle 200 to determine the virtual boundaries. The data can include a heading angle 9 of the target vehicle 200, i.e., an angle defined between an axis extending along a center line of the target vehicle 200 parallel to the longitudinal axis and the longitudinal axis of the global coordinate system. The data can include a longitudinal velocity $v_{tg}$ of the target vehicle 200, i.e., the velocity along the longitudinal axis, and the longitudinal velocity $v_h$ of the host vehicle 105. The data can include a wheelbase L of the target vehicle 200, i.e., a distance between a center of a front wheel and a center of a rear wheel of the target vehicle 200. The data can include a width W of the target vehicle 200. The data can include a steering angle $\delta$, i.e., an angle defined between an axis extending through a center of a front wheel of the host vehicle 105 and the longitudinal axis. The data can include a longitudinal input u, i.e., an acceleration along the longitudinal axis caused by brake and/or throttle input. The computer 110 can receive the steering angle $\delta$ and the longitudinal input u from the target vehicle 200 as steering and propulsion data over the network 125, e.g., broadcast as a message.

Figure 3:
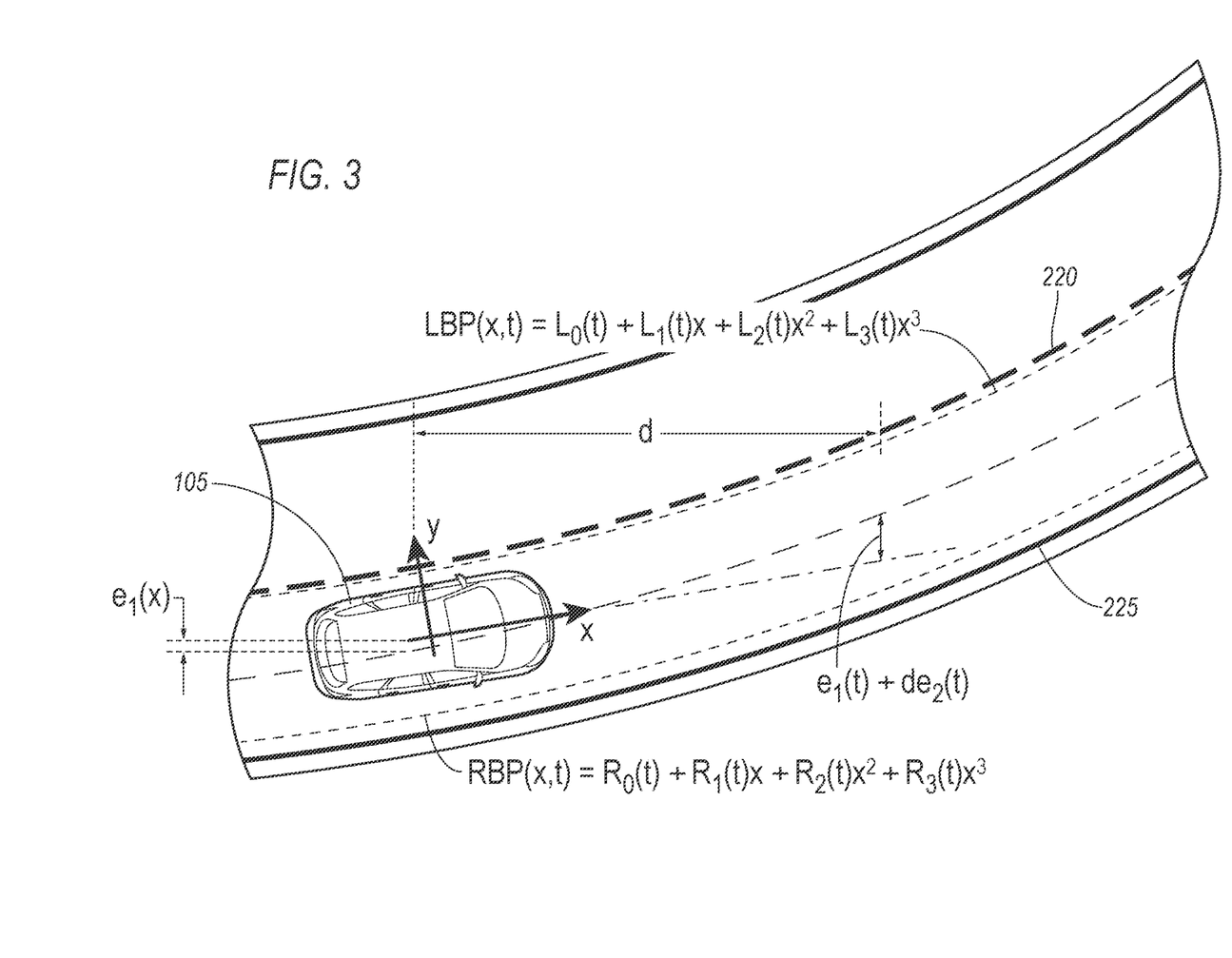
FIG. 3 is a top-down view of the roadway with virtual boundaries.

FIG. 3 is a diagram of path polynomials of left and right lane boundaries 220, 225 of the host roadway lane 210. A "path polynomial" is a predicted line represented as a polynomial equation of an upcoming distance x. In the present context, the "upcoming distance" x is a predetermined longitudinal distance in front of the host vehicle 105 from a front bumper of the host vehicle 105 at which the sensors 115 collect data and the path planning algorithm predicts the path. The upcoming distance x can be determined based on, e.g., a current speed of the host vehicle 105, a predetermined time threshold, determined based on empirical simulation data, a detection range of the sensors 115, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the host vehicle path polynomial, where braking torque and powertrain torque are applied as positive and negative longitudinal accelerations and clockwise and counter clockwise steering torque are applied as left and right lateral accelerations.

The path polynomial can represent any line that the computer 110 may use for operating the vehicle 105, e.g., a lane boundary, a predicted path of the host vehicle 105, a predicted path of the target vehicle 200, etc. The computer 110 can use a path polynomial to predict a lane boundary such as the left lane boundary 220 and/or the right lane boundary 225. Additionally, the computer 110 can use a path polynomial to predict a path that the host vehicle 105 will follow. The path polynomials that predict the lane boundaries 220, 225 can use different data and have different coefficients than a path polynomial that predicts a path that the host vehicle 105 will follow. For example, the path polynomials for the lane boundaries 220, 225 can use data from the roadway lanes 210, 215, and the path polynomials for the path of the host vehicle 105 can use data from one or more components 120, e.g., speed, steering angle, acceleration, etc. That is, the computer 110 can use a path polynomial that predicts a path of the host vehicle 105 to determine whether the predicted path of the host vehicle 105 crosses one of the path polynomials for the lane boundaries 220, 225.

As shown in FIGS. 2-3, the computer 110 can define equations LBP(x,t), RBP(x,t) representing the lane boundaries 220, 225 for a time t. The equations LBP(x,t), RBP(x,t) can be defined for coordinates x, y as path polynomials from a path planning algorithm:

$$LBP(x,t) = L_0(t) + L_1(t)x + L_2(t)x^2 + L_3(t)x^3 \qquad (1)$$

$$RBP(x,t) = R_0(t) + R_1(t)x + R_2(t)x^2 + R_3(t)x^3 \qquad (2)$$

where $L_0$, $R_0$ are offsets, i.e., lateral distances between the path and a center line of the host vehicle 105 at an upcoming longitudinal distance x, $L_1$, $R_1$ is a heading angle of the path, $L_2$, $R_2$ is the curvature of the path, and $L_3$, $R_3$ is the curvature rate of the path.

The computer 110 can determine a lateral offset error $e_1$ and a heading offset error $e_2$. The lateral offset error $e_1$ is a lateral distance between the current location of the host vehicle 105 and a planned path of the host vehicle 105, as shown in FIG. 3. The heading offset error $e_2$ is a difference between a current heading angle $\theta$ and a planned heading angle $\theta$. The computer 110 can use the errors $e_1$, $e_2$ to determine one or more constraint values c, as described below.

The computer 110 can determine the virtual boundaries according to equations $h_1$, $h_2$ based on the equations LBP(x), RBP(x) and the position $x_{tg}$, $y_{tg}$ of the target vehicle 200:

$$h_1(x, t) = L_0 - \frac{W}{2} \qquad (3)$$

$$h_2(x, t) = -R_0 - \frac{W}{2} \qquad (4)$$

The computer 110 can define equations $\dot{h}_1$, $\dot{h}_2$ to define a first boundary approach velocity to the first virtual boundary and a second boundary approach velocity to the second virtual boundary. The equations take a set of variables $X = [e_1, e_2, v_h]^T$, where the T superscript is the matrix transposition function. The computer 110 can determine the state model for $\dot{X}$:

$$\dot{X} = \begin{bmatrix} v_h e_2 \\ 0 \\ 0 \end{bmatrix} + \begin{bmatrix} 0 \\ \frac{v_h}{L} \\ 0 \end{bmatrix} \delta + \begin{bmatrix} 0 \\ 0 \\ g \end{bmatrix} u - \begin{bmatrix} 0 \\ 1 \\ 0 \end{bmatrix} \dot{\psi}_r \quad (5)$$

where g is the acceleration due to gravity and $\dot{\psi}_r$ is a heading change of the roadway 205 at the current location of the host vehicle 105, defined by $\dot{\psi}_r = v_h \kappa$, where $\kappa$ is a curvature of the roadway 205 at the current location of the host vehicle 105. The equations represent a simplified bicycle model for the target vehicle 200. For the example shown in FIG. 2, the equations can define the boundary approach velocities:

$$\dot{h}_1 = v_h L_1 \quad (6)$$

$$\dot{h}_2 = v_h R_1 \quad (7)$$

where $l_1$ is a predetermined value determined to generate real, positive eigenvalues of the constraint equations described below.

The computer 110 can define equations $\ddot{h}_1$, $\ddot{h}_2$ to define a first boundary approach acceleration to the first virtual boundary and a second boundary approach acceleration to the second virtual boundary:

$$\ddot{h}_1 = \begin{bmatrix} -\frac{v_h^2}{L} & gL_1 \end{bmatrix} \begin{bmatrix} \delta \\ u \end{bmatrix} + v_h^2 \cdot 2L_2 \quad (8)$$

$$\ddot{h}_2 = \begin{bmatrix} \frac{v_h^2}{L} & -gR_1 \end{bmatrix} \begin{bmatrix} \delta \\ u \end{bmatrix} - v_h^2 \cdot 2R_2 \quad (9)$$

Thus, the computer 110 can determine the boundary approach accelerations $\ddot{h}_1$, $\ddot{h}_2$ based on respective steering input, brake input, and throttle input to the host vehicle 105 and the target vehicle 200.

The computer 110 can identify a plurality of constraint values c. A "constraint value" c is a value based on one of the virtual boundaries, the boundary approach velocity, and the boundary approach acceleration that indicates motion of the target vehicle 200 to the virtual boundary. The computer 110 can compare the constraint value c to a predetermined threshold, as described below, to identify a maneuver of the target 200. The computer 110 can define equations to determine two constraint values $c_1$, $c_2$ based on the virtual boundary equations:

$$c_1(X) = \ddot{h}_1(X) + l_1 \dot{h}_1(X) + l_0 h_1(X) \quad (10)$$

$$c_2(X) = \ddot{h}_2(X) + l_1 \dot{h}_2(X) + l_0 h_2(X) \quad (11)$$

where $l_0, l_1$ are predetermined scalar values that provide real, positive eigenvalues to the equations $c_1(X) \geq 0$, $c_2(X) \geq 0$. That is, for eigenvalues $\lambda_1, \lambda_2, l_1 = \lambda_1 + \lambda_2; l_0 = \lambda_1 \lambda_2$. Thus, the first constraint value $c_1$ is based on the first boundary approach velocity $h_1$ of the target vehicle 200 and a first boundary approach acceleration $h_1$ of the target vehicle 200. The second constraint value $c_2$ is based on the second boundary approach velocity $h_2$ of the target vehicle 200 and a second boundary approach acceleration $h_2$ of the target vehicle 200. Alternatively, when acceleration data of the target vehicle 200 is unavailable, the first and second constraint values $c_1$, $c_2$ can be determined based on the boundary approach speeds $\dot{h}_1$, $\dot{h}_2$:

$$c_1(X) = \dot{h}_1(X) + l_0 h_1(X) \quad (12)$$

$$c_2(X) = \dot{h}_2(X) + l_0 h_2(X) \quad (13)$$

The computer 110 can determine whether one of the constraint values $c_1$, $c_2$ violates a threshold. In this context, a threshold is "violated" if the constraint value c is outside a range of values limited or defined by the threshold. For example, the threshold can be violated when the constraint value c exceeds the threshold. Alternatively, the threshold can be violated when the constraint value c falls below the threshold. In the example of FIG. 2, the computer 110 can perform the threat assessment when $c_1 < 0$ and/or $c_2 < 0$. The computer 110 can thus determine that the constraint values $c_1$, $c_2$ violate their respective thresholds based on a sign of the constraint values $c_1$, $c_2$, the "sign" being positive if the value exceeds 0, negative if the value is below 0, and 0 if the value equals 0. That is, if at least one of $c_1$, $c_2$ is negative, then at least one of the thresholds is violated. Alternatively or additionally, the computer 110 can determine that at least one of the constraint values $c_1$, $c_2$ is violated when at least one of the host vehicle 105 and/or the target vehicle 200 crosses one of the virtual boundaries.

When one of the first and/or second constraint values violates their respective threshold, the computer can perform a threat assessment of a collision between the host vehicle 105 and the target vehicle 200. Alternatively or additionally, the computer can perform the threat assessment upon detecting the target vehicle in the host roadway lane 205. A "threat assessment" is a prediction of a probability of a collision between the host vehicle 105 and the target vehicle 200. For example, the threat assessment can be an amount of longitudinal deceleration required to stop the host vehicle 105 before reaching the target vehicle 200. In another example, the threat assessment can be an amount of lateral acceleration to steer the host vehicle 105 away from the target vehicle 200. In another example, the threat assessment can be an amount of longitudinal acceleration required to move the host vehicle 105 past the target vehicle 200.

The computer 110 can actuate one or more vehicle components 120 to avoid the target vehicle 200 based on the threat assessment. For example, the computer 110 can actuate a steering motor 120 to provide the lateral acceleration to steer the host vehicle 105 away from the target vehicle 200. In another example, the computer 110 can actuate a propulsion 120 to accelerate the host vehicle 105 past the target vehicle 200. In another example, the computer 110 can actuate a brake 120 to slow or stop the host vehicle 105 until the target vehicle 200 passes the host vehicle 105.

The computer 110 can determine a threat assessment constraint value $c_3$. When the threat assessment constraint value $c_3$ violates a threshold, the computer 110 can perform the threat assessment. The threat assessment constraint value $c_3$ can be determined based on a function $h_3$ of the position $x_t$, $y_t$ of the target vehicle 200 using Lie derivatives:

$$h_3(t) = (x - x_{tg})^2 + (y - y_{tg})^2 - r_{min}^2 \quad (14)$$

$$\dot{h}_3(t) = \quad (15)$$

$$2(x - x_{tg})(v_h \cos(\theta) - v_{tg} \cos(\theta_{tg})) + 2(y - y_{tg})(v_h \sin(\theta) - v_{tg} \sin(\theta_{tg}))$$

$$\ddot{h}_3(t) = L_f^2 h_3 + L_g L_f h_3 \begin{bmatrix} \delta \\ u \\ \delta_{tg} \\ u_{tg} \end{bmatrix} \quad (16)$$

$$L_f^2 h_3 = 2 v_h^2 + 2 v_{tg}^2 - 4 v_h v_{tg} \cos(\theta - \theta_{tg}) \quad (17)$$

-continued $$L_g L_f h_3 = \begin{bmatrix} 2\frac{v_t^2}{L}(-(x-x_{tg})\sin(\theta)-(y-y_{tg})\cos(\theta)) \\ 2g((x-x_{tg})\cos(\theta)+(y-y_{tg})\sin(\theta)) \\ 2\frac{v_t^2}{L}((x-x_{tg})\sin(\theta_{tg})-(y-y_{tg})\cos(\theta_{tg})) \\ -2g((x-x_t)\cos(\theta_{tg})+(y-y_t)\sin(\theta_{tg})) \end{bmatrix}^T \quad (18)$$

$$c_3(X) = \ddot{h}_3(X) + l_1 \dot{h}_3(X) + l_0 h_3(X) \quad (19)$$

where $r_{min}$ is a predetermined minimum distance that the host vehicle 105 should remain from the target vehicle 200. The value for $r_{min}$ can be determined by, e.g., a manufacturer. That is, the manufacturer can perform empirical and/or virtual testing of actual and/or virtual vehicles 105, 200 following prescribed actual and/or virtual paths, and the manufacturer can determine $r_{min}$ as the minimum distance between the paths of the actual and/or virtual vehicles 105, 200 to avoid a collision between the vehicles 105, 200. Thus, the constraint value $c_3$ is based on the lateral distance and the longitudinal distance between the host vehicle 105 and the target vehicle 200, as shown in the $h_3$ term, and the lateral acceleration and the longitudinal acceleration between the host vehicle 105 and the target vehicle 200, as shown in the $\ddot{h}_3$ term.

Upon determining that one of the constraint values $c_1, c_2$ is violated, the computer 110 can input a previously determined prescribed steering angle $\delta_{nom}$ and a previously determined prescribed longitudinal input $u_{nom}$ to a cost function to determine a prescribed steering angle $\delta_p$ and a prescribed longitudinal input $u_p$. The "prescribed" steering angle and longitudinal input $\delta_p, u_p$ are a steering angle and longitudinal input that the computer 110 can attain such that the constraint values $c_1, c_2$ do not violate their respective thresholds. That is, the prescribed steering angle and longitudinal input $\delta_p, u_p$ are changed to the previously determined prescribed steering angle and longitudinal input $\delta_{nom}, u_{nom}$ so that the constraint values $c_1, c_2$ no longer violate their respective thresholds. The cost function can output a change to the steering angle $\bar{\delta}$ and a change to the longitudinal input $\bar{u}$ to attain the prescribed steering angle and longitudinal input $\delta_p, u_p$:

$$\delta_p = \delta_{nom} + \bar{\delta} \quad (1)$$

$$u_p = u_{nom} + \bar{u} \quad (2)$$

To determine the steering angle and longitudinal input $\bar{\delta}$, $\bar{u}$ to attain the prescribed steering angle and longitudinal input $\delta_p, u_p$, the computer 110 can solve the cost function J with constraints that the constraint values $c_1, c_2$ do not violate their respective thresholds:

$$J := (\bar{\delta}, \bar{u}) = \operatorname{argmin}[\delta \ u] Q \begin{bmatrix} \delta \\ u \end{bmatrix} \quad (22)$$

$$\text{s.t. } c_1 \geq 0, c_2 \geq 0$$

where "arg min" is the "argument minimum" function and Q a tunable matrix to determine weights for the steering angle $\delta$ and the longitudinal input u. That is, the arg min function finds the values for $\bar{\delta}, \bar{u}$ that minimize the cost function J while satisfying both $c_1 \geq 0, c_2 \geq 0$. Finding the minimum values $\bar{\delta}, \bar{u}$ that satisfy the thresholds for the constraint values $c_1, c_2$ allows the vehicle 105 to remain within the virtual boundaries with the minimum actuation of components 120. The computer 110 can minimize the cost function J using a conventional technique, e.g., an interior point algorithm, an active set algorithm, etc.

The matrix Q include weights $k_1, k_2$ to tune the cost function J:

$$Q = \begin{bmatrix} k_1 & 0 \\ 0 & k_2 \end{bmatrix} \quad (23)$$

where $k_1, k_2$ are empirically determined coefficients based on empirical and/or simulation testing of actual and/or virtual host vehicles 105 on actual and/or virtual roadways 205.

The computer 110 can determine the steering angle and longitudinal input $\bar{\delta}, \bar{u}$ to attain the prescribed steering angle and longitudinal input $\delta_p, u_p$ according to a plurality of constraint values c. For example, the computer 110 can determine a third constraint value $c_3$ for a probability of a collision, as described above. The computer 110 can output the steering angle and longitudinal input $\bar{\delta}, \bar{u}$ based on minimizing the cost function J such that the third constraint value $c_3$ does not violate a threshold and one of the constraint values $c_1, c_2$ can violate a respective threshold:

$$J := (\bar{\delta}, \bar{u}) = \operatorname{argmin}[\delta \ u] Q \begin{bmatrix} \delta \\ u \end{bmatrix} + k\gamma^2 \quad (24)$$

$$\text{s.t. } c_1 + \gamma \geq 0, c_2 + \gamma \geq 0, c_3 \geq 0$$

where k, y are predetermined values based on virtual and/or empirical testing of virtual vehicles 105 and virtual target vehicles 200, and $k_1, k_2 \ll k$. The variables k, $\gamma$ are "slack variables," i.e., tunable variables that allow violation of one or more of the constraint values, such as one of the constraint values $c_1, c_2, c_3$, to minimize the cost function J. In this example, the slack variables k, y can be tuned to allow violation of one of the constraint values $c_1, c_2$ but not to allow violation of the constraint value $c_3$. That is, the computer 110 can determine the steering angle and longitudinal input $\bar{\delta}, \bar{u}$ such that the third constraint value $c_3$ does not violate the threshold, avoiding a collision with the target vehicle 200, and allowing the vehicle 105 to cross one of the virtual boundaries, violating the respective threshold for one of the constraint values $c_1, c_2$. Allowing one of the thresholds for the virtual boundary constraint values $c_1, c_2$ to be violated can allow the computer 110 to more readily avoid the target vehicle 200 than requiring all three constraint values $c_1, c_2, c_3$ to satisfy their respective thresholds. That is, the computer 110 can more quickly minimize the cost function J when one of the virtual boundary constraint values $c_1, c_2$ can violate their respective threshold than requiring all three constraint values $c_1, c_2, c_3$ to satisfy their respective thresholds.

Figure 4:
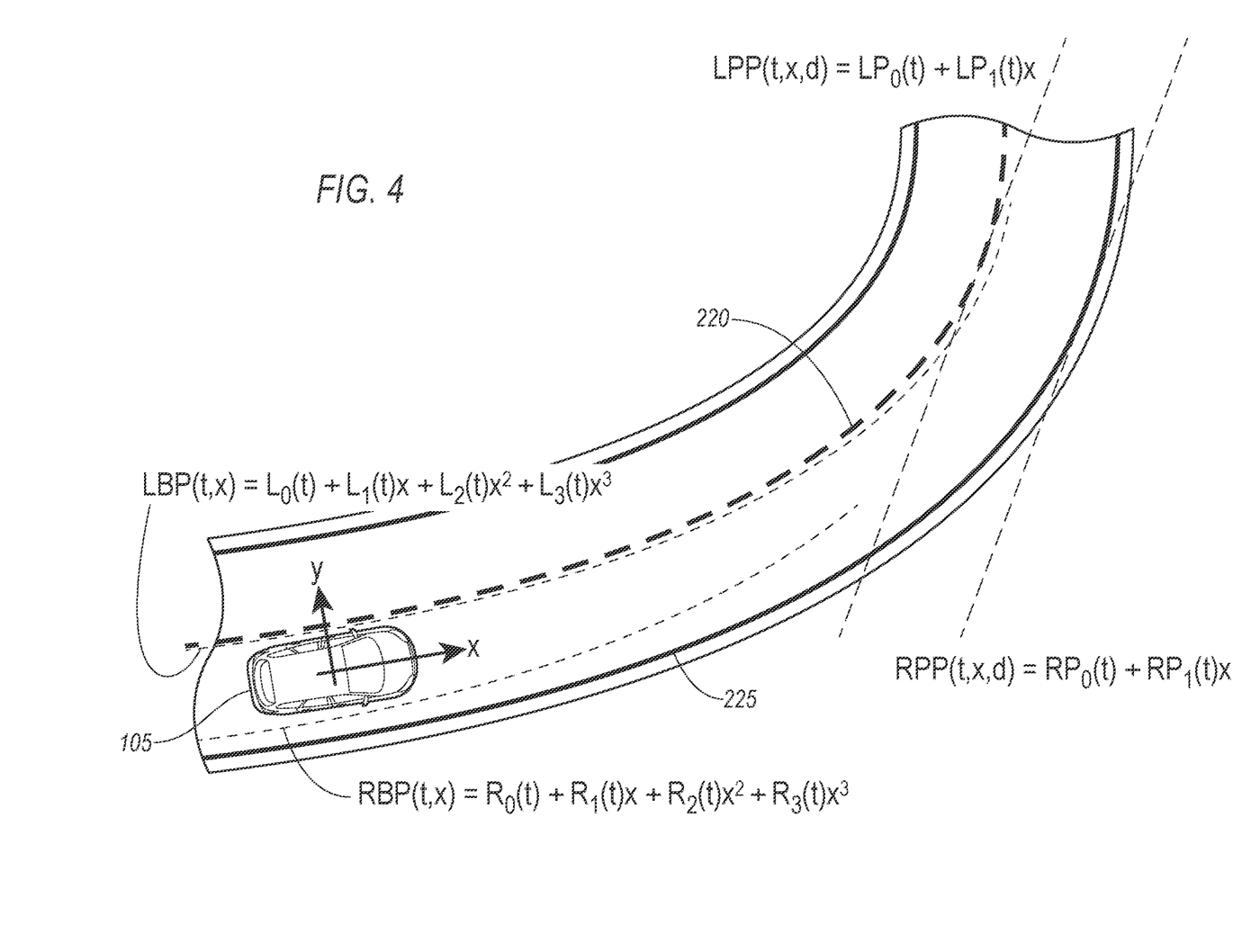
FIG. 4 is a top-down view of the roadway with predicted lane boundaries.

FIG. 4 is a diagram of the host vehicle 105 predicting a change in the host roadway lane 210. That is, the host roadway lane 210 can curve, and the computer 110 can predict the curve of the host roadway lane 210 to stay within the host roadway lane 210. The computer 110 can determine a fourth constraint value $c_4$ based on a predicted curvature $\kappa$ of the roadway 205. The computer 110 can determine a Boolean value $\alpha$ based on a sign of the curvature $\kappa$:

$$\alpha(t) = \begin{Bmatrix} 0 & \kappa(t) < 0 \\ 1 & \kappa(t) \geq 0 \end{Bmatrix} \quad (25)$$

The computer 110 can predict boundaries of a roadway lane and a predicted distance d according to path polynomials LPP(t, x, d), RPP(t, x, d):

$$LPP(t,x,d)=LP_0(t)+LP_1(t)d \quad (26)$$

$$RPP(t,x,d)=RP_0(t)+RP_1(t)d \quad (27)$$

where x is an upcoming distance, as described above, $LP_0$, $RP_0$ are the intercept points between the longitudinal axis of the vehicle and the predicted upcoming lane, and $LP_1$, $RP_1$ are the respective slopes of the left and right boundaries of the predicted upcoming lane. The values for $LP_0$, $LP_1$, $RP_0$, $RP_1$ can be determined by numerically integrating values for the curvature $\kappa$ at the predicted distance d, that is:

$$LP_1 = L_1 + \int_0^d \kappa(s)ds = L_1 + 2L_2 d \quad (28)$$

where s is a dummy variable representing the distance between the host vehicle 105 and the upcoming distance d and $L_1$, $L_2$ are values from the path polynomials described above in Equations 1, 2.

The computer 110 can determine functions $h_4$, $h_5$ based on the lane preview equations LP, RP described above:

$$h_4(t) = LP_0(t) = LBP(d) - dLP_1 \quad (29)$$

$$\dot{h}_4(t) = v_h LP_1 \quad (30)$$

$$\ddot{h}_4(t) = \left[-\frac{v_h^2}{L} gLP_1\right]\begin{bmatrix}\delta\\u\end{bmatrix} + v_h^2 \dot{\psi}_r \quad (31)$$

$$h_5(t) = -RP_0(t) = dRP_1 - RBP(d) \quad (32)$$

$$\dot{h}_5(t) = -v_h RP_1 \quad (33)$$

$$\ddot{h}_5(t) = \left[\frac{v_h^2}{L} -gRP_1\right]\begin{bmatrix}\delta\\u\end{bmatrix} + v_h^2 \dot{\psi}_r \quad (34)$$

From the functions $h_4$, $h_5$, the computer 110 can determine constraint values $c_4$, $c_5$:

$$c_4(X)=\ddot{h}_4(X)+l_1\dot{h}_4(X)+l_0 h_4(X) \quad (35)$$

$$c_5(X)=\ddot{h}_5(X)+l_1\dot{h}_5(X)+l_0 h_5(X) \quad (36)$$

The computer 110 can minimize the cost function J according to at least some of the constraint values $c_3$, $c_4$, $c_5$. For example, the computer 110 can minimize the cost function J to satisfy the constraint values $c_1$, $c_2$, $c_4$, $c_5$ and the Boolean value $\alpha$ described above:

$$J := (\bar{\delta}, \bar{u}) = \operatorname{argmin}[\delta\ u]Q\begin{bmatrix}\delta\\u\end{bmatrix} \quad (37)$$

$$\text{s.t. } c_1 \geq 0, c_2 \geq 0, \alpha c_4 \geq 0, (1-\alpha)c_5 \geq 0$$

Alternatively, the computer 110 can minimize the cost function J to satisfy all five constraint values:

$$J := (\bar{\delta}, \bar{u}) = \operatorname{argmin}[\delta\ u]Q\begin{bmatrix}\delta\\u\end{bmatrix} + k\gamma^2 \quad (38)$$

$$\text{s.t. } c_1 + \gamma \geq 0, c_2 + \gamma \geq 0, c_3 \geq 0, \alpha c_4 + \gamma \geq 0, (1-\alpha)c_5 \geq 0$$

The components 120 can define a maximum steering angle $\delta_{max}$, a maximum longitudinal input $u_{max}$, and a minimum longitudinal input $u_{min}$. The maximum steering angle $\delta_{max}$ is a maximum steering angle that the wheels and the steering component 120 can attain and is determined based on the specific construction of the wheels and the steering component 120. The maximum and minimum longitudinal inputs $u_{max}$, $u_{min}$ are the maximum and minimum brake and throttle inputs that the propulsion 120 and the brake 120 can provide and are determined based on the specific construction of the propulsion 120 and the brake 120. To prevent outputting a prescribed steering angle and longitudinal input $\delta_p$, $u_p$ that the components 120 cannot attain, the computer 110 can determine constraint values $c_6$, $c_7$ based on the maximum steering angle $\delta_{max}$, the previously determined prescribed steering angle $\delta_{nom}$, the minimum longitudinal input $u_{min}$, the maximum longitudinal input $u_{max}$, and the previously determined prescribed longitudinal input $u_{nom}$:

$$c_6 = \delta_{max} - |\delta - \delta_{nom}| \quad (39)$$

$$c_7 = u_{max} - |u + u_{nom}| \quad (40)$$

where the threshold for $c_6$ is 0 and the threshold for $c_7$ is $u_{min}$. Thus, when the cost function J is constrained by the constraint values $c_6$, $c_7$, the changes $\bar{\delta}$, $\bar{u}$ will not exceed the limits $\delta_{max}$, $u_{max}$, $u_{min}$.

The computer 110 can actuate one or more components 120 to attain the prescribed steering angle and the prescribed longitudinal input $\delta_p$, $u_p$. For example, the computer 110 can actuate a steering motor 120 according to the change in the steering angle $\bar{\delta}$ to attain the prescribed steering angle $\delta_p$. Additionally, the computer 110 can actuate the propulsion 120 or the brake 120 to provide the acceleration or deceleration of the change in longitudinal input $\bar{u}$ to attain the prescribed longitudinal input $u_p$. Upon actuating the components 120, the currently prescribed steering angle $\delta_p$ becomes the previously determined prescribed steering angle $\delta_{nom} = \delta_p$ and the currently prescribed longitudinal input $u_p$ becomes the previously determined prescribed longitudinal input $u_{nom} = u_p$ for the current time t.

Figure 5:
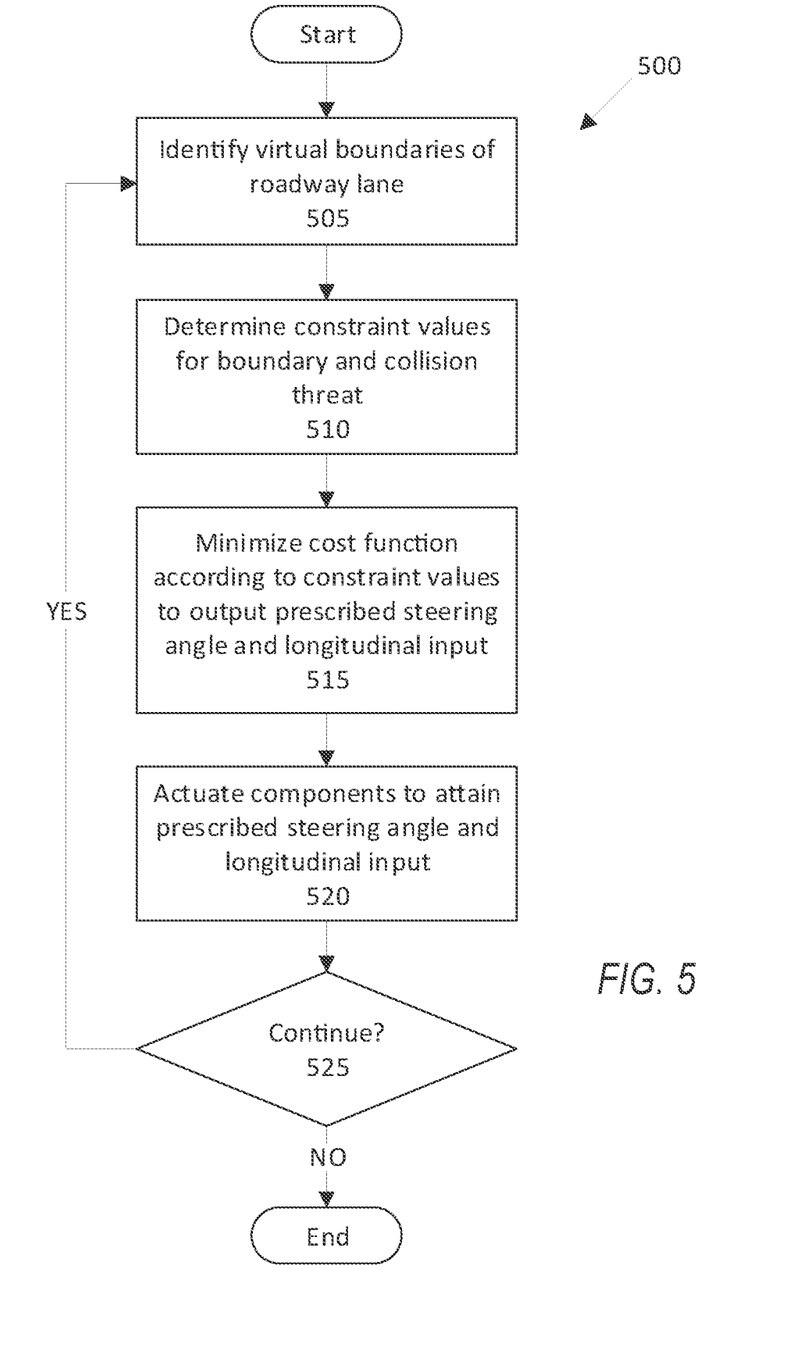
FIG. 5 is a diagram of an example process for operating the vehicle.

FIG. 5 is an example process 500 for operating a vehicle 105. The process 500 begins in a block 505, in which a computer 110 of the vehicle 105 identifies virtual boundaries of a host roadway lane 210. The computer 110 can identify the virtual boundaries with boundary equations $h_1$, $h_2$, as described above.

Next, in a block 510, the computer 110 determines one or more constraint values c for crossing the virtual boundaries and/or colliding with an identified target vehicle 200. As described above, the constraint values c are values that indicate motion of the host vehicle 105 and/or the target vehicle 200 to the virtual boundaries. The constraint values c can be based on one or more boundary functions h, $\dot{h}$, $\ddot{h}$ using Lie derivatives, as described above. For example, a constraint value c can indicate motion of the host vehicle 105 toward a predicted lane boundary.

Next, in a block 515, the computer 110 minimizes a cost function J according to the constraint values c to output a prescribed steering angle $\delta_p$ and a prescribed longitudinal input $u_p$. As described above, the computer 110 can use a conventional cost function minimizing algorithm (such as quadratic programming) to minimize the cost function J such that the constraint values c are not violated. The computer 110 can output the steering angle $\delta$ and the longitudinal input u that minimize the cost function J as the prescribed steering angle $\delta_p$ and the prescribed longitudinal input $u_p$.

Next, in a block 520, the computer 110 actuates one or more components 120 to attain the prescribed steering angle $\delta_p$ and the prescribed longitudinal input $u_p$. For example, the computer 110 can actuate a steering wheel to attain the prescribed steering angle $\delta_p$. In another example, the computer 110 can actuate a propulsion to attain the prescribed longitudinal input $u_p$.

Next, in a block 525, the computer 110 determines whether to continue the process 500. For example, the computer 110 can determine to continue the process 500 upon detecting another target vehicle 200. If the computer 110 determines to continue, the process 500 returns to the block 505. Otherwise, the process 500 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first," "second," and "third" are used throughout this document as identifiers and are not intended to signify importance or order.

The invention claimed is:

1. A system, comprising a vehicle and computer including a processor and a memory, the memory storing instructions executable by the processor to:

identify first and second virtual boundaries of a roadway lane, in which the vehicle is travelling, corresponding to predicted paths of respective first and second boundary lines between the roadway lane in which the vehicle is travelling and respective adjacent first and second roadway lanes;

determine a first constraint value based on a first virtual boundary approach acceleration of the vehicle relative to the first virtual boundary, the first virtual boundary approach acceleration based on a steering wheel angle of the vehicle and input to one of a brake or a propulsion of the vehicle;

determine a second constraint value based on a second virtual boundary approach acceleration of the vehicle relative to the second virtual boundary, the second virtual boundary approach acceleration based on a steering wheel angle of the vehicle and input to one of the brake or the propulsion of the vehicle;

output, from a minimized cost function, a prescribed steering angle, a prescribed brake input, and a prescribed propulsion input when one of the first or second constraint values violates a respective threshold; and actuate one or more components of the vehicle to attain the prescribed steering angle, the prescribed brake input, and the prescribed propulsion input.

2. The system of claim 1, wherein the instructions further include instructions to determine a third constraint value based on predicted probability of a collision between the vehicle and a target vehicle and to output the prescribed steering angle, the prescribed brake input, and the prescribed propulsion input when the third constraint value violates a threshold.

3. The system of claim 2, wherein the output from the minimized cost function violates one of the thresholds for the first constraint value or the second constraint value and does not violate the threshold for the third constraint value.

4. The system of claim 2, wherein the instructions further include instructions to predict the probability of the collision based on a lateral distance between the vehicle and the target vehicle and a longitudinal distance between the vehicle and the target vehicle.

5. The system of claim 2, wherein the instructions further include instructions to predict the probability of the collision based on a lateral acceleration between the vehicle and the target vehicle and a longitudinal acceleration between the vehicle and the target vehicle.

6. The system of claim 1, wherein the instructions further include instructions to determine a third constraint value based on a predicted curvature of the roadway lane and to output the prescribed steering angle, the prescribed brake input, and the prescribed propulsion input when the third constraint value violates a threshold.

7. The system of claim 6, wherein the instructions further include instructions to determine a third virtual boundary of the roadway lane and to determine the third constraint value based on a third virtual boundary approach acceleration.

8. The system of claim 1, wherein the instructions further include instructions to determine a third constraint value based on a maximum steering angle and to output the prescribed steering angle, the prescribed brake input, and the prescribed propulsion input when the third constraint value violates a threshold.

9. The system of claim 1, wherein the instructions further include instructions to determine a third constraint value based on a maximum throttle input and a maximum brake input and to output the prescribed steering angle, the prescribed brake input, and the prescribed propulsion input when the third constraint value violates a threshold.

10. The system of claim 1, wherein the instructions further include instructions to minimize the cost function with a quadratic programming algorithm.

11. The system of claim 1, wherein the first virtual boundary is a lateral distance of the vehicle to a left boundary line of the roadway lane and the second virtual boundary is a lateral distance of the vehicle to a right boundary line of the roadway lane.

12. The system of claim 1, wherein the instructions further include instructions to determine the first constraint value based on a first virtual boundary approach velocity.

13. A method for control of a vehicle, comprising:
identifying first and second virtual boundaries of a roadway lane, in which the vehicle is travelling, corresponding to predicted paths of respective first and second boundary lines between the roadway lane in which the vehicle is travelling and respective adjacent first and second roadway lanes;
determining a first constraint value based on a first virtual boundary approach acceleration of the vehicle relative to the first virtual boundary, the first virtual boundary approach acceleration based on a steering wheel angle of the vehicle and input to one of a brake or a propulsion of the vehicle;
determining a second constraint value based on a second virtual boundary approach acceleration of the vehicle relative to the second virtual boundary, the second virtual boundary approach acceleration based on the steering wheel angle of the vehicle and input to one of the brake or the propulsion of the vehicle;
outputting, from a minimized cost function, a prescribed steering angle, a prescribed brake input, and a prescribed propulsion input when one of the first or second constraint values violates a respective threshold; and actuating one or more components of the vehicle to attain the prescribed steering angle, the prescribed brake input, and the prescribed propulsion input.

14. The method of claim 13, further comprising determining a third constraint value based on predicted probability of a collision between the vehicle and a target vehicle and outputting the prescribed steering angle, the prescribed brake input, and the prescribed propulsion input when the third constraint value violates a threshold.

15. The method of claim 13, further comprising determining a third constraint value based on a predicted curvature of the roadway lane and outputting the prescribed steering angle, the prescribed brake input, and the prescribed propulsion input when the third constraint value violates a threshold.

16. The method of claim 13, further comprising determining the first constraint value based on a first virtual boundary approach velocity.

17. A vehicle, comprising:
a brake;
a propulsion;
means for identifying first and second virtual boundaries of a roadway lane, in which the vehicle is travelling, corresponding to predicted paths of respective first and second boundary lines between the roadway lane in which the vehicle is travelling and respective adjacent first and second roadway lanes;
means for determining a first constraint value based on a first virtual boundary approach acceleration of the vehicle relative to the first virtual boundary, the first virtual boundary approach acceleration based on a steering wheel angle of the vehicle and input to one of the brake or the propulsion;
means for determining a second constraint value based on a second virtual boundary approach acceleration of the vehicle relative to the second virtual boundary, the second virtual boundary approach acceleration based on the steering wheel angle of the vehicle and input to one of the brake or the propulsion;
means for outputting, from a minimized cost function, a prescribed steering angle, a prescribed brake input, and a prescribed propulsion input when one of the first or second constraint values violates a respective threshold; and
means for actuating one or more vehicle components to attain the prescribed steering angle, the prescribed brake input, and the prescribed propulsion input.

18. The system of claim 17, further comprising means for determining a third constraint value based on predicted probability of a collision between the vehicle and a target vehicle and means for outputting the prescribed steering angle, the prescribed brake input, and the prescribed propulsion input when the third constraint value violates a threshold.

19. The system of claim 17, further comprising means for determining a third constraint value based on a predicted curvature of the roadway lane and means for outputting the prescribed steering angle, the prescribed brake input, and the prescribed propulsion input when the third constraint value violates a threshold.

20. The system of claim 17, further comprising means for determining the first constraint value based on a first virtual boundary approach velocity.

* * * * *